Sept. 11, 1923.
H. M. PFLAGER
SIX-WHEEL CAR TRUCK
Filed May 26, 1921   3 Sheets-Sheet 1
1,467,684
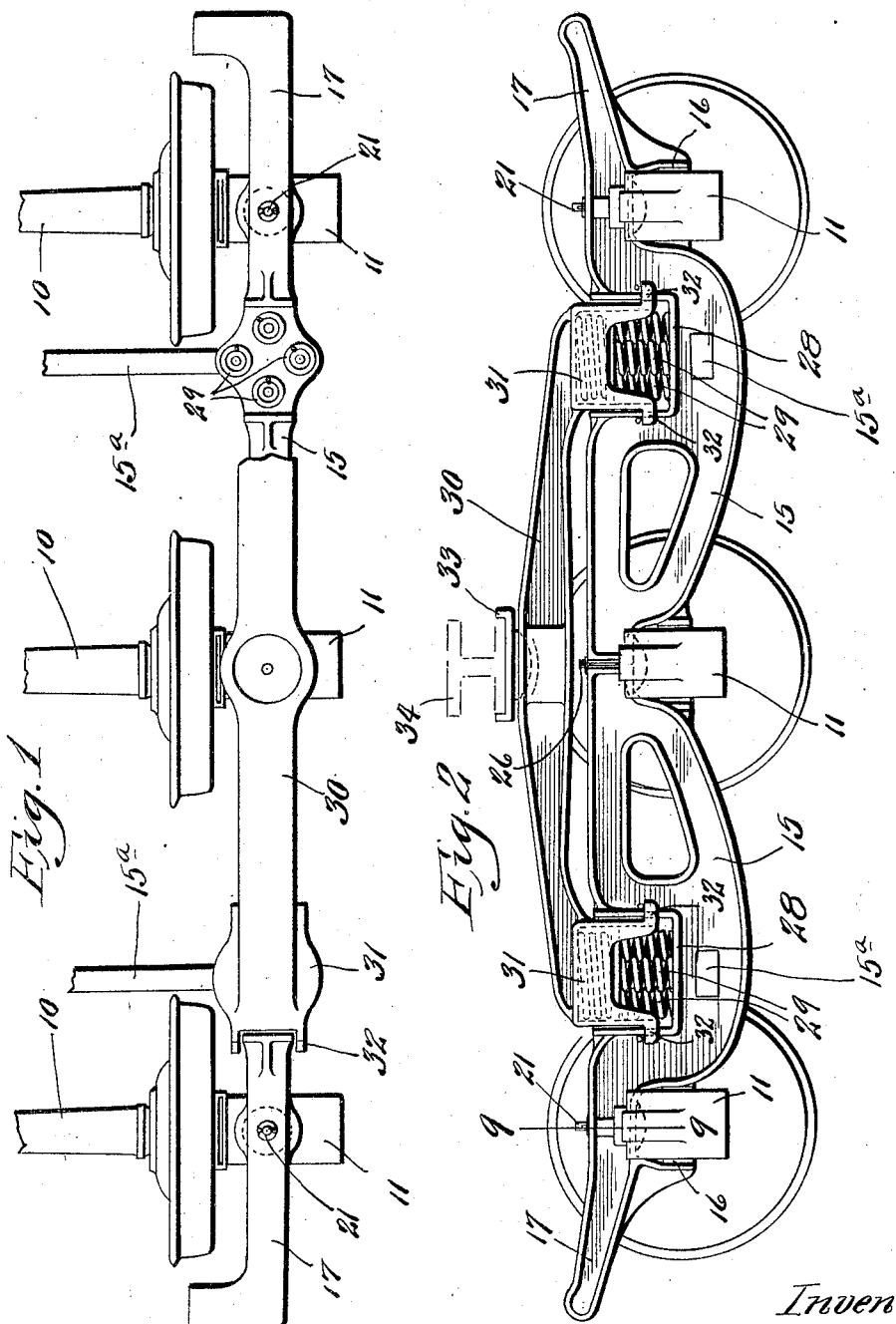
Inventor
Harry M. Pflager Sept. 11, 1923.
H. M. PFLAGER
SIX-WHEEL CAR TRUCK
Filed May 26, 1921
1,467,684
3 Sheets-Sheet 2
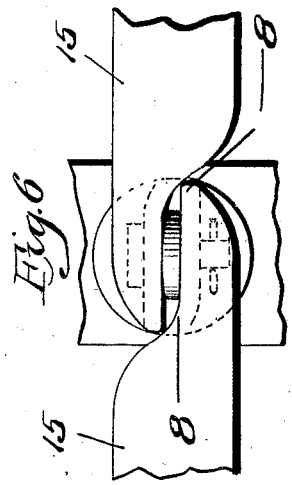
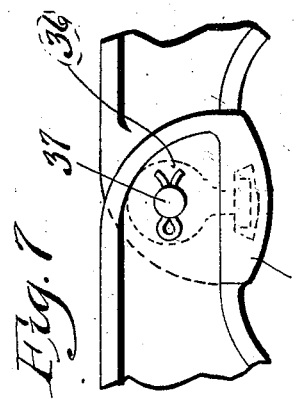
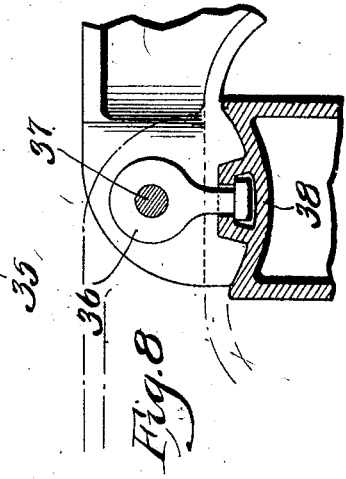
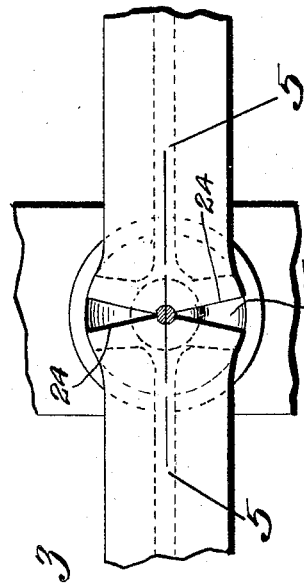
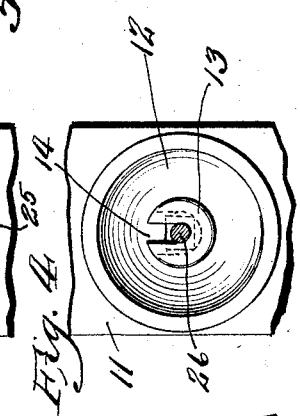
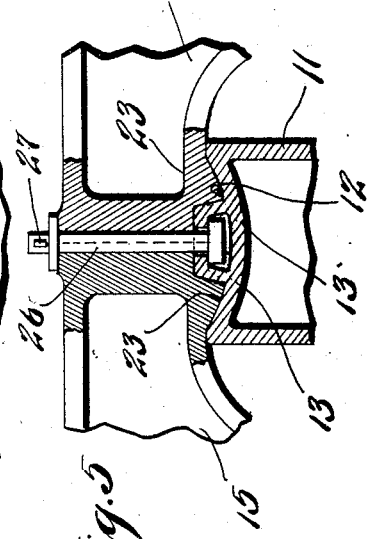
Inventor
Harry M. Pflager

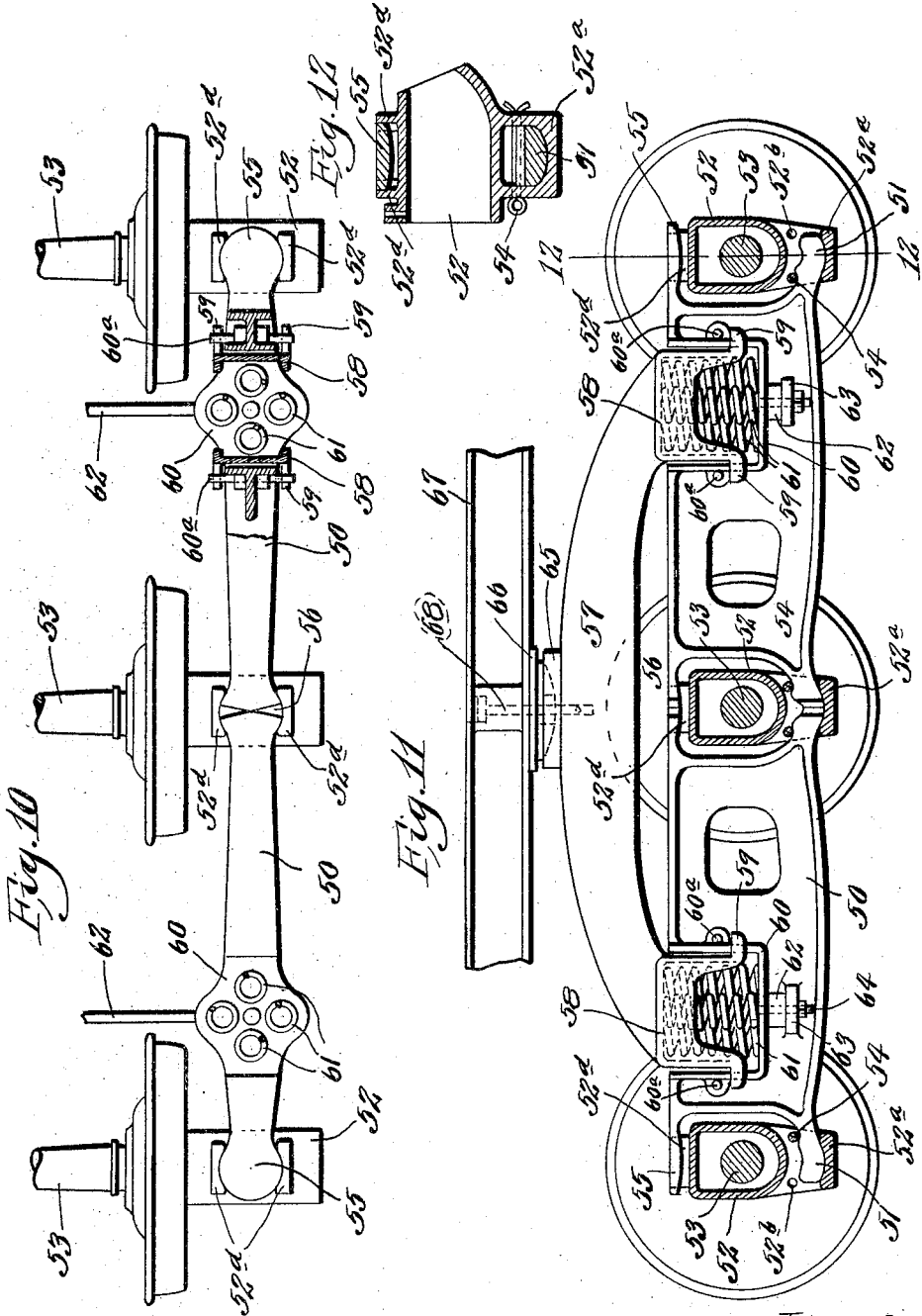

Patented Sept. 11, 1923.

1,467,684

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

SIX-WHEEL CAR TRUCK.

Application filed May 26, 1921. Serial No. 472,826.

*To all whom it may concern:*

Be it known that I, HARRY M. PFLAGER, a citizen of the United States, residing at St. Louis, Missouri, have invented a certain new and useful Improvement in Six-Wheel Car Trucks, of which the following is a full, clear, and exact description, such as will enable others skilled in the art to which it appertains to make and use the same, reference being had to the accompanying drawings, forming part of this specification.

My invention relates generally to railway car truck construction and more particularly to new and improved side frame and spring equalizer arrangements for six wheel trucks, and which improvements are especially designed to materially increase the flexibility of the truck and to yieldingly support the truck frame upon the journal boxes.

The principal objects of my invention are, to form each side frame of the articulated truck in two parts that bear directly upon and are connected to the truck journal boxes, thereby providing side frames which have the desired degree of flexibility, and, further, to combine with each two-piece side frame, an equalizer member which serves as a support for the end of the body bolster, and the end portions of said equalizer bearing upon springs that in turn bear upon the parts of the side frame, and said springs being positioned with respect to the journal boxes so as to effect an equal distribution of the loads imposed upon the truck between all of the journals.

Further objects of my invention are, to provide for the equal distribution and absorption of shocks and vibrations due to track irregularities and prevent such shocks and vibrations from being transmitted to the car body, thereby making the riding movement of the latter more easy and gentle.

With the foregoing and other objects in view, my invention consists in certain novel features of construction and arrangements of parts, hereinafter more fully described and claimed, and illustrated in the accompanying drawings, in which—

Figure 1 is a top plan view of the side portion of a six wheel truck frame of my improved construction, with one end of the equalizing member broken away.

Figure 2 is a side elevational view of a six wheel truck constructed in accordance with my invention.

Figure 3 is a plan view of a portion of the middle journal box and showing the inner ends of the side frame members positioned thereupon.

Figure 4 is a top plan view of the middle journal box of my improved truck and showing the bearing thereon for the inner ends of the side frame members.

Figure 5 is a sectional view taken approximately on the line 5—5 of Figure 3.

Figure 6 is a plan view of a modified form of the connection between the inner ends of the side frame members and the center journal box.

Figure 7 is an elevational view of the modified form of connection illustrated in Figure 6.

Figure 8 is a sectional view taken approximately on the line 8—8 of Figure 6.

Figure 9 is an enlarged detail section taken approximately on the line 9—9 of Figure 2.

Figure 10 is a plan view of one side of a modified form of my improved construction.

Figure 11 is a side elevational view partly in section of the same.

Figure 12 is a sectional view on the line 12—12 of Figure 11.

Referring by numerals to the accompanying drawings, which illustrate a practical embodiment of my invention, 10, 10 designate the ordinary wheel carrying axles of a six wheel truck, the journals thereof having bearing in journal boxes 11. The top plates of these journal boxes are provided with shallow-cup-shaped recesses 12 which serve as bearings for parts of the side frames of the trucks, and projecting upwardly in the center of each of these bearings is a hollow circular lug 13, the side wall and top of which is slotted as designated by 14 in order to receive the head and shank of a bolt utilized for connecting the side frame to the journal box as hereinafter more fully described.

Each side frame is formed in two parts that are identical in construction, each part comprising a body portion 15 that is provided in its underside and near its outer end with a recess or pocket 16 which receives the corresponding end of the outer journal boxes 11. The outer end of each side frame member 15 terminates in an arm or bracket 17, the same projecting a substantial distance beyond the recess or pocket 16 and serving as a support and point of attachment for the corresponding brake beam hanger (not shown). Suitably located cross ties such as 15ª disposed laterally of the truck frame connect the side frame members on one side of the truck with the corresponding members on the other side. That portion of each member 15 that bears upon the outer journal box is provided with a convex undersurface 18 which fits snugly within the bearing 12 and formed in the center of this convex bearing is a recess 19 which accommodates the centrally arranged lug 13.

Formed through that portion of each member 15 that is immediately above the convex bearing 18 is an aperture 20 which receives the shank of a bolt 21, the head of the latter being positioned in the hollow lug 13 and the upper end of said bolt projecting a substantial distance above the top of member 15 and being secured in any suitable manner, preferably by means of a washer and key 22. The inner ends of each side frame member 15 or that portion which rests upon the middle journal box is provided on its underside with a half convex bearing 23 and the halves on the inner ends of the two side frame members co-operate to form practically a full bearing which rests upon the recess 12 that is formed in the top of the middle journal box 11.

In order to permit the members 15 of each side frame to swing in horizontal planes independently of each other upon the bearing 12 on the middle journal box, the vertical faces 24 at the inner ends of said members 15 are cut away to the sides of the pin or bolt which connects said side frames to the middle journal box, thereby forming relatively narrow spaces 25 which gradually increase in width toward the side faces of frame members 15. (See Fig. 3.)

A bolt such as 26 is utilized for connecting the inner ends of the side frame members 15 to the middle journal box, the head of said bolt being positioned in the hollow lug 13 of said journal box and the shank of said bolt extending upwardly at a central point between the inner ends of the side frame members and said bolt being secured in position in any suitable manner, preferably by means of a washer and key or cotter pin 27. (See Fig. 5.)

By virtue of the constructions just described, said frame members are flexibly connected to the journal boxes and at the same time they are connected so that when the truck is out from under the car, it can be lifted bodily inasmuch as the side frames are connected to the journal boxes by means of the bolts 21 and 26, and said journal boxes carry the axles and wheels.

Formed in the upper portion of each side frame member 15 is a substantially U-shaped pocket or recess 28, the center of which is located at a point substantially one-third of the distance from the center of the outer journal box to the center of the middle journal box, and arranged in each of these pockets or recesses and resting upon the side frame member is a spring or a nest of springs 29.

The body of a rigid equalizing member 30 overlies the inner end portions of the side frame members 15 and formed integral with the ends of this equalizer are spring housings 31 which receive the upper portions of the springs 29. Formed integral with the sides of these spring housings are depending plates or brackets 32 which co-operate with parts of the side frame members 15 forming the sides of the recesses 28 to guide the equalizer and the side frame members 15 during their relative vertical movements, there being sufficient clearance between the parts to permit of lateral play or movement. Carried by the center of each equalizer 30 is a plate 33, the same serving as a support for a body bolster 34, which bolster is a part of the car underframe and has a ball and socket connection at each end with the equalizer bars on the opposite sides of the car.

Where a railway car is supported by a pair of six wheel trucks of my improved construction, the car body and the weight of the loads carried thereby is supported at four points, namely, through the plates 33 that are carried upon the central portions of the equalizing members 30, and by virtue of my improved construction, and particularly the arrangement of the springs 29 at points substantially one-third the distance from the outer journal boxes to the middle journal box, the weight of the car body and the load carried thereby is distributed equally between all of the truck journals, and at same time, the construction of the side frames and means employed for mounting the same upon the journal boxes provides a construction that is sufficiently flexible to render the riding movement of the truck comparatively easy and gentle, and at the same time absorbing and minimizing shocks and vibration due to track irregularities.

In the modified construction illustrated in Figures 6, 7 and 8, the inner ends of the side frame members 15 overlap or extend past each other in parallel vertical planes and the undersides of these overlapping inner ends are provided with convex bearings 35 which rest in the concave bearing on top of the middle journal box. Interposed between these overlapping ends is the upper portion of an eye-bolt 36 through which passes a transversely disposed pin or bolt 37, the latter also passing through the overlapping inner ends of the side frame members 15. The head 38 on the lower end of the eye-bolt is positioned in the hollow lug that projects upwardly from the center of the bearing on the middle journal box. (See Figure 8.)

In Figures 10, 11 and 12, I have shown a modified construction of my improved articulated six wheel truck in which the side frames are underhung with respect to the journal boxes. In this form of my invention, the side frames 50 are provided with convex bearing projections 51 at their outer extremities, which are seated in socket bearings 52$^a$ provided by downwardly extending stirrup projections from the journal boxes 52 in which the axles 53 are mounted. The vertical legs of these stirrup projections are formed with openings 52$^b$ in which are arranged cotter pins 54 co-operating with lugs or projections on the upper faces of the projecting bearing extensions. The purpose of these cotter pins is to prevent accidental disarrangement of the ball and socket joints between the side frames and the journal boxes. The journal boxes have extensions 52$^d$ on their upper walls between which are arranged circularly shaped guide projections 55. The purpose of this construction is to prevent sidewise titling or displacement of the underhung side frames of the truck. It is not intended in this particular construction that the spherical projections 55 shall carry any portion of the load.

The inner ends of the side frames of the truck are provided with convex bearing surfaces which are designed to be seated in the stirrup member 52$^a$. The contiguous faces of these inner bearing ends are inclined so as to permit a horizontal swinging movement of the side frames relative to the centrally located journal box. These radially disposed V-shaped spaces are also provided for the same purpose as indicated at 56 in Figure 10.

57 indicates an equalizer bar having spring caps 58 preferably formed integral therewith and at each end thereof, these spring caps having guiding lugs 59 which engage the edges of a recess or opening on each truck side frame. The bottom wall is enlarged to form a spring seat 60 upon which are mounted equalizer bar supporting springs 61. Cotter pins 60$^a$ are passed through the truck side frames above the guide lugs 59 to limit the upward movement of the spring caps 58 in their recesses. Tie bars 62 are preferably arranged between the spring seats 60 and perforated lugs 63, the ends of the tie bars being pivotally connected to the side frames of the truck by means of bolts 64, these tie bars having a sufficient clearance at their points of connection with the side frames to permit of a limited horizontal swinging movement.

65 indicates a concave bearing member centrally located with respect to the equalizer bar 57. This bearing plate co-operates with a companion bearing plate member 66 secured to the body bolster 67, or other part of the underframe of the car body, the king pin 68 being preferably employed to prevent accidental displacement of the members of this bearing 65, 66. One of these bearing members, preferably the lower, is provided with an enlarged opening through which the king pin passes so as to provide the necessary clearance required by the ball and socket connection between the equalizer bars 57 and the underframe of the car body.

A six wheel truck of my improved construction is comparatively simple, can be easily and cheaply produced, is very strong and durable, has the desired degree of flexibility, and is constructed so as to effect an equal distribution of the weight of the supported loads between the truck journals.

It will be readily understood that minor changes in the size, form and construction of the various parts of my improved six wheel truck can be made and substituted for those herein shown and described, without departing from the spirit of my invention, the scope of which is set forth in the appended claims.

I claim:

1. In a six wheel car truck, a side frame formed in two parts, each part being carried by the middle journal box of the truck and one of the outer journal boxes, and having universal operative connections therewith, an equalizer member, and springs interposed between the parts of the side frame and said equalized member.

2. In a six wheel car truck, a side frame formed in two parts, each part being carried by the middle journal box of the truck and one of the outer journal boxes, and having universal operative connections therewith, an equalizer member, and springs interposed between the parts of the side frame and said equalizer member, said springs being located at points on the parts of the side frame one-third the distance from the outer journal boxes toward the middle journal box.

3. In a six wheel car truck, a side frame formed in two parts, each part resting upon the middle journal box of the truck and one of the outer journal boxes, and having ball and socket connections therewith, an equalizer member, and springs interposed between the parts of the side frame and said equalizer member, said springs bearing upon the side frame parts at points adjacent to the outer journal boxes.

4. In a six wheel car truck, the combination with wheel carrying axles and journal boxes, of a side frame formed in two parts, each of which bears on and has ball and socket connections with the middle journal box and one of the outer journal boxes, and a spring supported equalizer carried by said side frame parts.

5. In a six wheel car truck, the combination with wheel carrying axles and journal boxes, of a side frame formed in two parts, each of which bears on and has universal connections with the middle journal box and one of the outer journal boxes, springs bearing upon said side frame parts, and an equalizer supported by said springs.

6. In a six wheel car truck, the combination with wheel carrying axles and journal boxes, of a side frame formed in two parts, each of which bears on and has universal connections with the middle journal box and one of the outer journal boxes, springs arranged on said side frame parts at points substantially one-third the distance from the outer journal boxes toward the middle journal box, and an equalizer supported by said springs.

7. In a six wheel car truck, a side frame formed in two parts, each of which is supported by and flexibly connected to the middle journal box and one of the outer journal boxes, and a spring supported equalizer carried by the parts of said side frame.

8. In a six wheel car truck, a side frame formed in two parts, each of which is supported by and flexibly connected to the middle journal box and one of the outer journal boxes, springs bearing upon the parts of the side frame at points adjacent to the outer journal boxes, and an equalizer supported by said springs.

9. In a six wheel car truck, the combination with wheel carrying axles and journal boxes, of a side frame member supported by and flexibly connected to each outer journal box and the middle journal box, and a spring supported equalizer carried by the pair of side frame members.

10. In a six wheel car truck, the combination with wheel carrying axles and journal boxes, of a side frame member supported by and flexibly connected to each outer journal box and the middle journal box, a spring positioned on each side frame member, and an equalizer supported by said springs, the latter being located at points substantially one-third the distance from the outer journal boxes toward the middle journal box.

11. In a six wheel car truck, the combination with wheel carrying axles and journal boxes, of a side frame formed in two parts, each of which bears on the middle journal box and one of the outer journal boxes, said side frame parts being flexibly connected to the journal boxes and movable in vertical and horizontal directions relative thereto and means integral with said side frame parts for supporting parts of the brake gear.

12. The combination with a pair of six wheel trucks, of a car body supported at four points on said truck, and means including articulated side frames flexibly connected to the journal boxes for effecting an equal distribution of the weight of the car body and load carried thereby between all of the journals of said trucks.

13. The combination with a pair of six wheel car trucks, of a car body supported at two different points on each truck, and means including articulated side frames flexibly connected to the journal boxes for effecting an equal distribution of the weight of said car body and load carried thereby between all of the journals on said trucks.

14. The combination with a six wheel car truck, of means for supporting a car body at two points on said truck, and means including articulated side frames, the members of each side frame being adapted to move in a horizontal plane independently of each other and of the corresponding journal boxes for effecting an equal distribution of the weight of said car body and load carried thereby between all of the journals of said trucks.

15. A six wheel car truck comprising wheel carrying axles and journal boxes, and articulated side frames having pivotal relation to each end of their respective journal boxes.

16. A six wheel car truck comprising wheel carrying axles and journal boxes, articulated side frames each member of which has ball and socket connections with said journal boxes, and equalizer bars.

17. A six wheel car truck comprising wheel carrying axles and journal boxes, articulated side frames, ball and socket connections between each member of said side frames and said journal boxes, and means for preventing accidental displacement of said ball and socket connections.

18. A six wheel car truck having wheel carrying axles and journal boxes, truck side frames having pivotal connections with said journal boxes, and tie bars for pivotally connecting said truck side frames together.

19. A six wheel car truck comprising wheel carrying axles and journal boxes, articulated truck side frames having lateral and vertical pivotal relation to said journal boxes, and equalizer bars supported by said truck side frames and having horizontal and vertical movements independently of said truck side frames.

20. A six wheel car truck comprising wheel carrying axles and journal boxes, articulated truck side frames having pivotal relation to said journal boxes, equalizer bars supported by said truck side frames and having horizontal and vertical movements independently of said truck side frames, and tie bars pivotally connecting opposite side frames together.

21. A six wheel car truck comprising wheel carrying axles and journal boxes, articulated truck side frames having pivotal relation to said journal boxes, equalizer bars supported by said truck side frames and having horizontal and vertical movements independently of said truck side frames, tie bars pivotally connecting opposite side frames together, said tie bars being connected to said truck side frames at points approximately in a vertical plane with the supporting points of the equalizer bars.

22. A six wheel car truck comprising wheel carrying axles and journal boxes, said journal boxes having sockets and truck side frames having convex surfaces designed to be received by the journal box sockets at their outer ends, the inner ends of said truck side frames being seated in a socket carried by the centrally located journal box.

23. A six wheel car truck comprising wheel carrying axles and journal boxes, said journal boxes having sockets and truck side frames having convex surfaces designed to be received by the journal box sockets at their outer ends, the inner ends of said truck side frames being seated in a socket common to the contiguous ends of said truck side frames carried by the centrally located journal boxes.

24. A six wheel car truck comprising wheel carrying axles and journal boxes, side frames having ball and socket connections with said journal boxes, the ball and socket connections and the contiguous ends of the side frames over the centrally located journal boxes being divided.

25. A six wheel car truck comprising wheel carrying axles and journal boxes, side frames having ball and socket connections with said journal boxes, the ball and socket connections and the contiguous ends of the side frames over the centrally located journal boxes being vertically divided.

26. A six wheel car truck comprising wheel carrying axles and journal boxes, articulated side frames having ball and socket connections with said journal boxes, and means for connecting the side frames to the journal boxes in vertical planes with the axles whereby the journal boxes may be lifted with the side frames.

27. A six wheel car truck comprising wheel carrying axles and journal boxes, articulated side frames the members of which have ball and socket connections with said journal boxes, means for preventing accidental disarrangement of said ball and socket connections, and equalizer bars yieldingly supported by said side frames.

28. A six wheel car truck comprising wheel carrying axles and journal boxes, and underhung side frames having universal connections with said journal boxes.

29. A six wheel car truck comprising wheel carrying axles and journal boxes, and underhung side frames having pivotal connections with said journal boxes.

30. A six wheel car truck comprising wheel carrying axles and journal boxes, and underhung side frames having ball and socket connections with said journal boxes.

31. A six wheel car truck comprising wheel carrying axles and journal boxes, said journal boxes having depending stirrups and side frames supported in said stirrups.

32. A six wheel car truck comprising wheel carrying axles and journal boxes having socket stirrups, and side frames mounted for universal movement in the sockets in said stirrups.

33. A six wheel car truck comprising wheel carrying axles and journal boxes, and side frames in pivotal engagement with said journal boxes above and below the top and bottom walls thereof.

34. A six wheel car truck comprising wheel carrying axles and journal boxes, and underhung side frames having engagement with the upper portions of said journal boxes to prevent tilting or canting movement of said side frames.

35. A six wheel car truck comprising wheel carrying axles and journal boxes and underhung side frames, said side frames being centrally divided, their contiguous ends engaging the middle journal box above and below the top and bottom walls thereof.

36. A six wheel car truck comprising wheel carrying axles and journal boxes provided with socket bearings, side frames having spherical faces designed to be seated in said sockets, and means for retaining the spherical faces of said side frames in position in said socket bearings.

37. The combination with a journal box having a socket bearing, side frames whose contiguous ends are provided with spherical surfaces seated in said socket, and means for holding the contiguous ends of the side frames in position in the socket.

38. A journal box having a downwardly extending stirrup provided with a socket bearing, and upwardly extending guide members, said stirrup and guide members being adapted to cooperate with the side frame.

39. A journal box having a downwardly extending stirrup and upwardly extending guide lugs, both adapted to cooperate with a truck side frame, and means for retaining the truck side frame in position on the stirrup.

40. A truck side frame having upwardly opening recesses and a spring seat at the bottom thereof, in combination with an equalizer bar yieldingly supported upon said spring seat, and means for holding the end of the equalizer bar in the spring seat.

41. A truck side frame having upwardly opening recesses and a spring seat at the bottom thereof, in combination with an equalizer bar yieldingly supported upon said spring seat, and means for preventing the withdrawal of the end of the equalizer bar in an upward direction out of said recess.

42. A truck side frame having an outwardly opening recess whose bottom wall is in the form of a spring seat, and a tie bar pivotally connected to the side frame beneath said spring seat.

43. A truck side frame having an outwardly opening recess whose bottom wall is in the form of a spring seat, and an equalizer bar having spring caps at each end and guiding lugs on said caps.

44. An equalizing bar arranged above the side frame of a truck and provided at each end with downwardly presented spring seats which are adapted to engage springs carried by said side frame, said equalizing bar having ball and socket connection with the underframe of the car.

45. An equalizer bar in combination with the underframe of a car, and a ball and socket connection between the two, said equalizer bar being adapted to be arranged above the side frame of a truck and having downwardly presented spring seats at its ends adapted to engage the springs carried by the side frame of said truck.

46. An equalizer bar in combination with the underframe of a car, a ball and socket connection between the two, and a king pin passing through said ball and socket connection.

47. A six wheel car truck comprising wheel carrying axles and journal boxes, articulated frames carried by and having flexible connections with said journal boxes, equalizer bars yieldingly supported by said side frames, a car underframe, and a pivotal connection between said car underframe and said equalizer bar.

In testimony whereof I hereunto affix my signature this 21st day of May, 1921.

HARRY M. PFLAGER.